(12) United States Patent
Hayes et al.

(10) Patent No.: US 7,698,907 B1
(45) Date of Patent: Apr. 20, 2010

(54) MOLD ASSEMBLY FOR GLASS ARTICLES (75) Inventors: Dan M. Hayes, Perrysburg, OH (US);
Russell M. Hauser, Sylvania, OH (US);
Dudley T. Olson, Toledo, OH (US);
Robert E. Nuzum, Berkey, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 667 days.

(21) Appl. No.: 08/679,781

(22) Filed: Jul. 15, 1996

(51) Int. Cl.
C03B 9/38 (2006.01)

(52) U.S. Cl. .............................. 65/361; 65/359; 65/267; 65/319; 65/355

(58) Field of Classification Search ................... 65/265, 65/267, 319, 348, 359, 356, 360, 361, 355; 249/79, 111, 139
See application file for complete search history.

(56) References Cited

U.S. PATENT DOCUMENTS

| | | | | |
|---|---|---|---|---|
| 1,633,028 A | * | 6/1927 | La France | |
| 2,485,836 A | * | 10/1949 | MacConnell, Jr. ............ | 65/356 |
| 2,928,214 A | * | 3/1960 | Mumford ..................... | 65/361 |
| 3,024,571 A | * | 5/1962 | Abbott et al. | |
| 3,133,807 A | * | 5/1964 | Denman et al. ............... | 65/356 |
| 3,137,560 A | * | 6/1964 | Ketcham ....................... | 65/356 |
| 3,224,860 A | * | 12/1965 | Stinnes ........................ | 65/355 |
| 3,251,673 A | * | 5/1966 | Brymer, Jr. ................... | 65/361 |
| 3,268,322 A | * | 8/1966 | Denman ....................... | 65/361 |
| 3,338,699 A | * | 8/1967 | Colchagoff et al. ........... | 65/356 |
| 3,573,025 A | * | 3/1971 | Hamilton ...................... | 65/319 |
| 3,586,491 A | * | 6/1971 | Mennitt ........................ | 65/355 |
| 3,607,207 A | * | 9/1971 | Dahms et al. ................. | 65/359 |
| 3,653,870 A | * | 4/1972 | Foster et al. | |
| 3,887,350 A | | 6/1975 | Jenkins ........................ | 65/356 |
| 3,888,647 A | * | 6/1975 | Breeden et al. ............... | 65/319 |
| 4,067,711 A | * | 1/1978 | Jones ........................... | 65/319 |
| 4,070,174 A | * | 1/1978 | Nebelung et al. ............. | 65/355 |
| 4,101,306 A | * | 7/1978 | Schaar ......................... | 65/359 |
| 4,388,099 A | * | 6/1983 | Hermening et al. ........... | 65/267 |
| 4,505,730 A | * | 3/1985 | Foster .......................... | 65/162 |
| 4,512,792 A | | 4/1985 | Irwin et al. | |
| 4,657,573 A | | 4/1987 | Jones ........................... | 65/265 |
| 4,668,269 A | | 5/1987 | Cantu-Garcia et al. ........ | 65/356 |

(Continued)

FOREIGN PATENT DOCUMENTS

DE 148875 * 1/1981 .................. 65/355

(Continued)

Primary Examiner—Steven P Griffin
Assistant Examiner—Queenie Dehghan (57) ABSTRACT

A mold assembly (10; 40) for molding a hollow glass article comprising a mold (12) that is made up of a separable pair of mold elements (12a, 12b; 42) and a mold holder (14; 44) that surrounds a portion of the mold of substantial axial length. The mold is separable from the mold holder, and the exterior of each mold segment is provided with a plurality of cooling fins (12e; 42e). The mold holder is made up of a separable pair of mold holder sections (16, 18; 46), and each mold holder section has a fluid flow passage (20; 50) extending therethrough. The fluid flow passage is radially open to permit fluid flowing therethrough to flow inwardly against the fins of an adjacent mold element. Each mold holder section has a perforated screen (26; 56) affixed thereto to vary the distribution of the flow of fluid from the mold holder section against the fins of the adjacent mold element.

15 Claims, 6 Drawing Sheets

U.S. PATENT DOCUMENTS

| | | | | |
|---|---|---|---|---|
| 4,690,703 | A | 9/1987 | Kulig | 65/265 |
| 4,750,929 | A | 6/1988 | Bolin | |
| 4,783,212 | A | 11/1988 | Loffler | 65/265 |
| 5,364,437 | A | 11/1994 | Bolin | 65/265 |

FOREIGN PATENT DOCUMENTS

| | | |
|---|---|---|
| EP | 0 297 021 | 12/1988 |
| EP | 0 612 697 A1 | 8/1994 |
| FR | 2.103.648 | 4/1972 |
| GB | 1122899 | 8/1968 |

\* cited by examiner

MOLD ASSEMBLY FOR GLASS ARTICLES

FIELD OF THE INVENTION

This invention relates to a mold assembly for use in forming hollow glass articles on a forming machine of the individual section ("I.S.") type. More particularly this invention relates to a mold assembly of the foregoing character that provides positive, indirect cooling of the article being molded in the mold assembly.

BACKGROUND OF THE INVENTION

Hollow glass articles, such as bottles and jars, when molded by a forming machine of the I.S. type, are molded in two steps. In the first step, a preform of the finished container, which is usually called a blank or a parison, is molded by an annular mold made up of a pair of mating blank mold sections. Upon the completion of the blank molding step, the blank mold sections separate and the blank or parison is transferred to another mold station, often called the blow mold station, where it is blown into its final shape by another annular mold that is made up of another mating pair of mold sections. At the conclusion of the blow mold process, the mating sections of the blow mold are separated, and the container is removed from the forming machine for further processing.

The glass gob that is formed into a parison in the blank mold of an I.S. machine is sufficiently hot to be capable of being shaped into a blank and, thus, possesses a high level of latent heat. Much of this heat must be removed before the container is removed from the blow mold of the forming machine, however, so that the finished container will be sufficiently rigid to undergo further processing without any further change in its shape. Thus, much heat must be removed from the container being formed, both during the blank molding step and the blow molding step, and unless the heat is removed at a rapid rate, the productivity of the forming machine is unduly limited. The problem of heat removal from the molds of an I.S. forming machine at a suitable rate is especially important at the blank mold station because the surface area of the parison is quite small due to the small diameter of the parison, which limits the rate at which heat can be removed, and the amount of heat to be removed is quite high due to the larger wall thicknesses of the parison in comparison to the wall thicknesses of a finished container.

Various prior artisans have addressed problems encountered in cooling glass articles being formed by an I.S. machine, as disclosed by U.S. Pat. Nos. 3,887,350 (Jenkins), 4,657,573 (Jones), 4,668,269 (Cantu-Garcia et al.), 4,690,703 (Kulig), 4,783,212 (Loffler) and 5,364,437 (Bolin), the disclosure of each of which is incorporated by reference herein. The problems with the aforesaid and other prior art approaches to mold cooling of I.S. machine molds is that they add considerably to the complexity, and thus the cost, of the forming machine molds, each set of which is especially designed for only a single type of product. Thus, it is advantageous to incorporate as much of the required mold cooling structure in other structure of an I.S. molding machine that does not need to be changed every time a set of molds is replaced to permit the machine to manufacture containers of a different type, size or design.

BRIEF DESCRIPTION OF THE INVENTION

According to the present invention there is provided a mold assembly for a glass forming machine of the I.S. type. The mold assembly includes an annular mold, which is made up of a mating pair of mold sections, whose internal surface, when the mold sections are joined end to end, defines the external shape of a glass article to be formed in an internal cavity of such annular mold, either the final shape of a glass article in the case of a blow mold or the shape of a preform of such article in a blank mold. The exterior of each of the mold sections is provided with a circumferential plurality of radially projecting, axially extending spaced apart ribs to extend the surface of the mold sections to thereby increase the rate at which latent heat can be removed from the molten glass article within the mold.

The mold assembly also includes a split mold holder for holding the mold sections of a mold, as heretofore described. The mold holder, which is suitable for use with a variety of molds, surrounds the mold and directs air or other cooling fluid radially inwardly against the ribs on the exterior of the mold sections from radially open, axially extending flow passages. A split, perforated screen is applied to the interior of each of the sections of the mold holder and controls the distribution of the flow of cooling fluid against the mold. Thus, by controlling the pattern of the perforations in the perforated screen, it is possible to vary the rate of cooling of the mold sections, circumferentially and axially, to equalize the rate of cooling of the glass article in the mold, notwithstanding variations in the thickness or shape of the glass article, which effects the rate at which latent heat is to be removed from different locations of the glass article.

Because the sections of the mold holder, and the perforated screen sections that are attached to them, can be used with a variety of molds, the fabrication costs of the molds are reduced in comparison to costs of molds whose coolant flow passages are contained in the molds themselves.

Accordingly, it is an object of the present invention to provide an improved mold assembly for a glass forming machine. More particularly, it is an object of the present invention to provide a mold assembly of the foregoing character with improved indirect cooling of a molten glass article being formed therein. Even more particularly, it is an object of the present invention to provide a mold assembly of the foregoing character of reduced mold structural complexity.

For a further understanding of the present invention and the objects thereof, attention is directed to the drawing and the following description thereof, to the detailed description of the preferred embodiment and to the appended claims.

DETAILED DESCRIPTION OF THE PREFERRED EMBODIMENT

Figure 1:
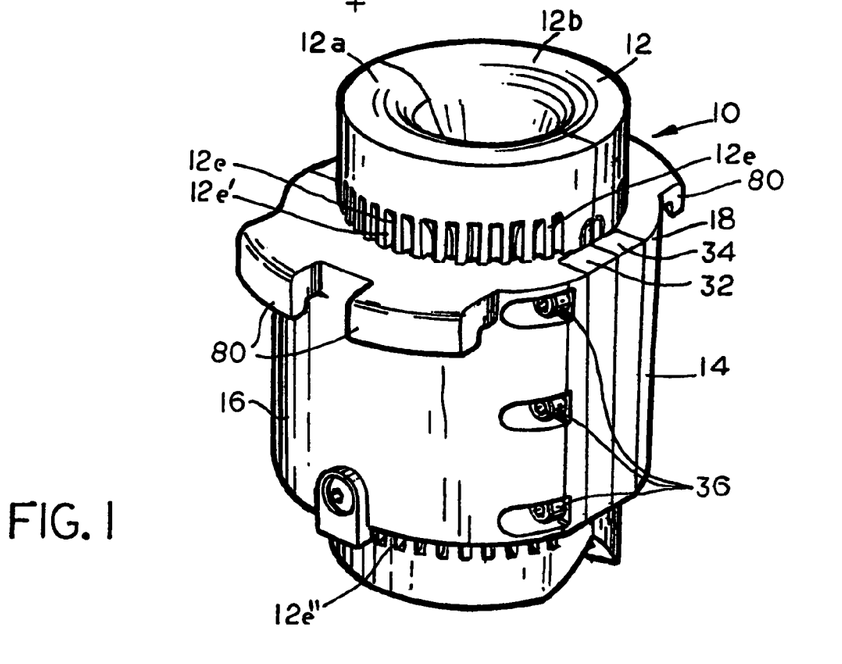
FIG. 1 is a perspective view of a mold assembly according to a preferred embodiment of the adaption of the present invention to the blank mold station of an I.S. glass forming machine.

A mold assembly according to the preferred embodiment of the present invention is identified generally by reference numeral 10 in FIG. 1, and is made up of an annular mold 12, which is illustrated as being suitable for use in forming a parison of a glass container. The mold assembly 10 also includes an annular mold holder 14, which encloses a substantial portion of the axial length of the mold 12 and is a part of an I.S. glass container forming machine or at least is a part that does not need to be replaced when the mold 12 is replaced.

Figure 2:
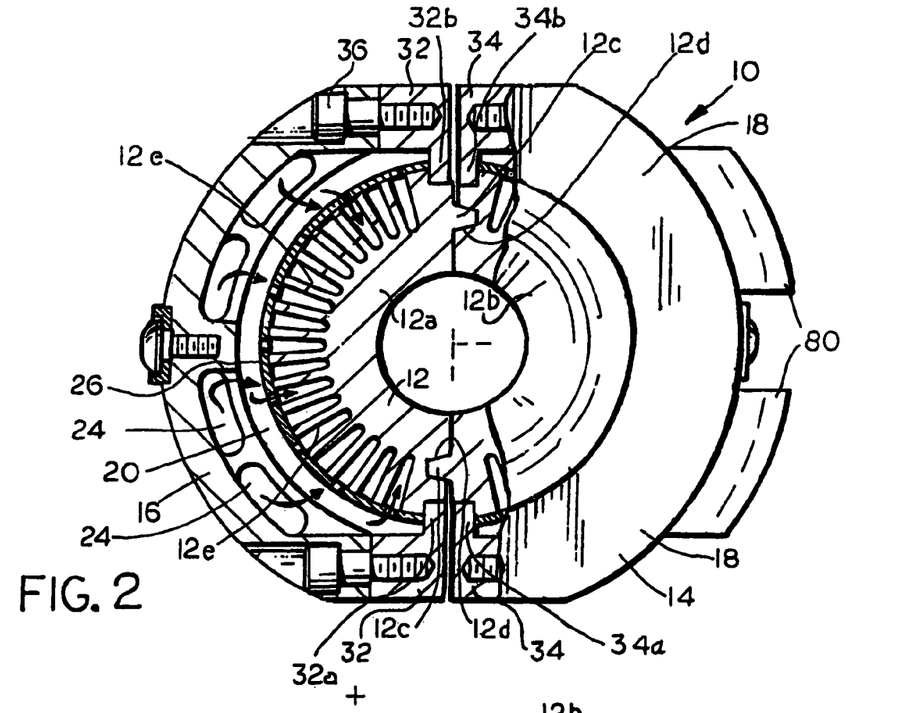
FIG. 2 is a plan view, partially in section and at an enlarged scale, of the mold assembly in FIG. 1, being taken substantially along the line 2-2 in FIG. 3.

The annular mold 12 is made up of generally semi-cylindrical mold elements 12a, 12b, which, when joined end to end during a molding operation, substantially enclose a glass article being molded in a cavity therein. The mold elements 12a, 12b are separable from one another at the conclusion of a molding step, to permit a molded article to be removed therefrom, as is known in the art. In that regard, each of the mold elements 12a, 12b is provided with a tongue 12c and a groove 12d, which are diametrically opposed to one another, to permit a mold elements 12a, 12b to be precisely aligned with one another during the molding operation. Each of the mold elements 12a, 12b is also provided with a circumferentially disposed, radially projecting and axially extending series of spaced apart fins 12e, which assist in the cooling of a glass article being formed in the mold 12 to make the glass article more rigid and self-supporting than it would otherwise be at its required, elevated molding temperature. As illustrated in FIG. 2, the outer tips of the fins 12e define a curved surface, specifically, a semi-circular surface.

The mold holder 14 is made up of generally semi-cylindrical holder sections 16, 18, which are positioned substantially end to end during a molding step but are separable from one another at the conclusion of a molding step when the mold elements 12a, 12b separate from one another to remove a molded article therefrom. Each of the holder sections 16, 18 has a generally semi-cylindrical flow passage 20 extending axially therethrough. The passage 20, which is radially open on its interior, serves to permit cooling air or other coolant, from a source to be hereinafter described in greater detail, to flow against the fins 12e of the mold sections 12a, 12b to assist in the indirect cooling of a glass article being formed within the mold 12.

Figure 3:
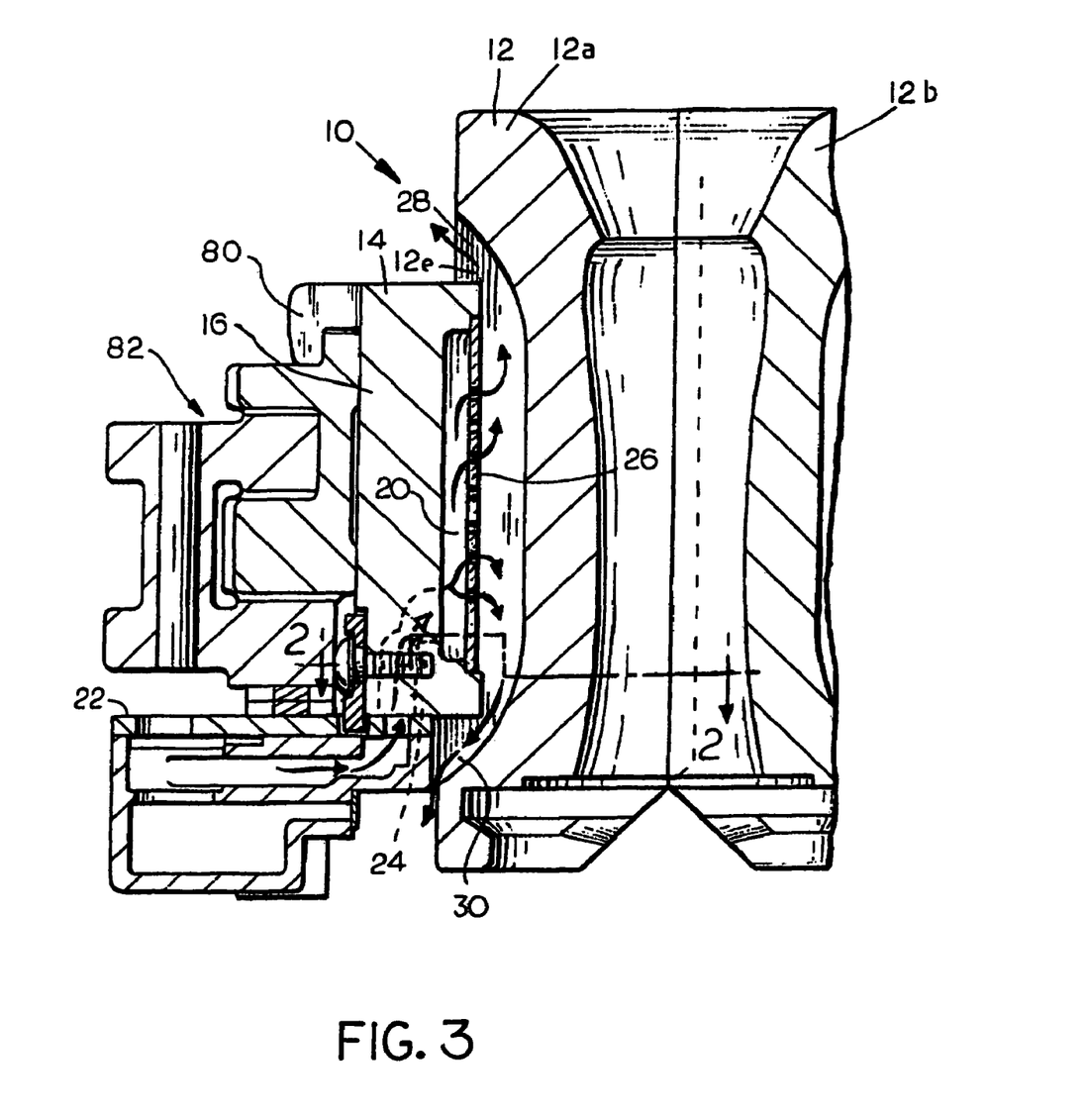
FIG. 3 is fragmentary elevational view, in cross section and at an enlarged scale, of the mold assembly of FIG. 1.
Figure 4:
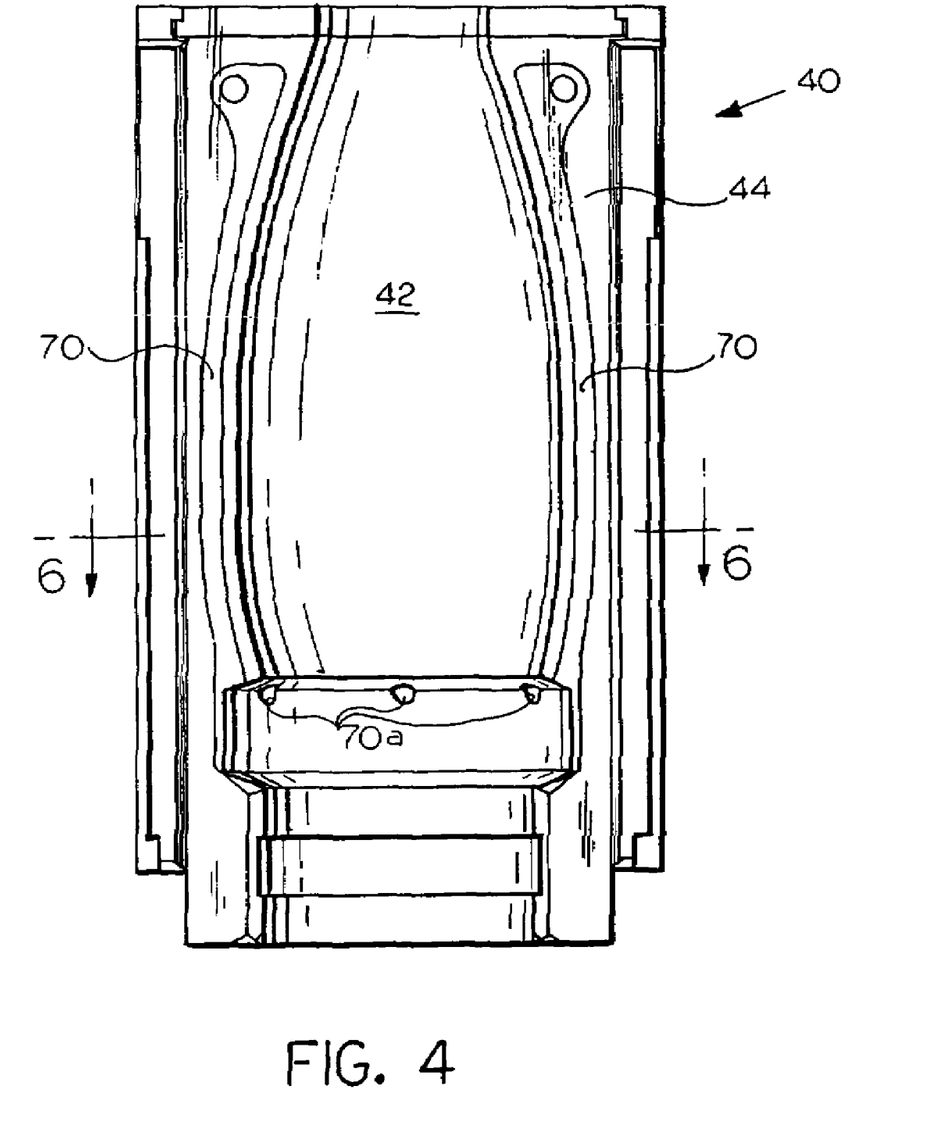
FIG. 4 is an elevational view of a mold section, from the inside or internal cavity looking outwardly, of a mold assembly according to a preferred embodiment of the adaptation of the present invention to the blow mold station of an I.S. glass forming machine.
Figure 5:
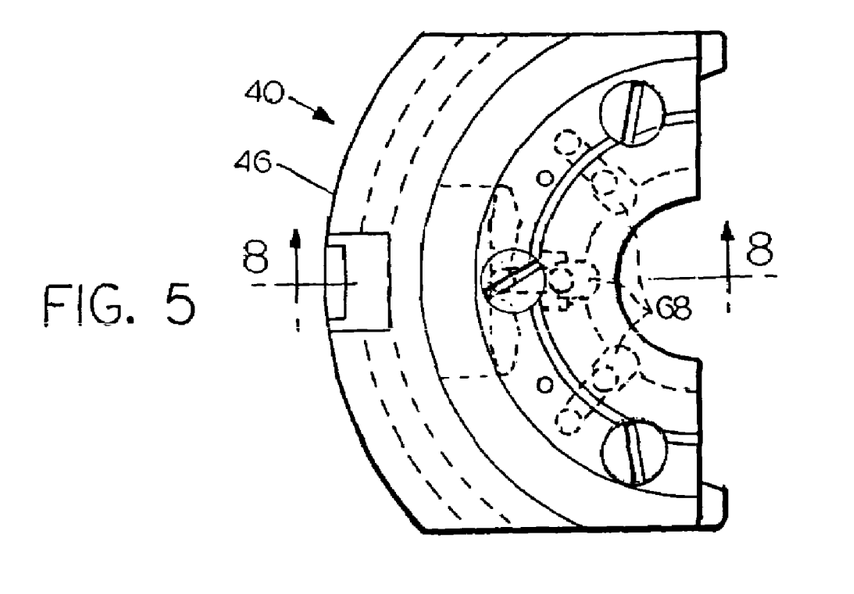
FIG. 5 is a top plan view of the mold section shown in FIG. 4.
Figure 6:
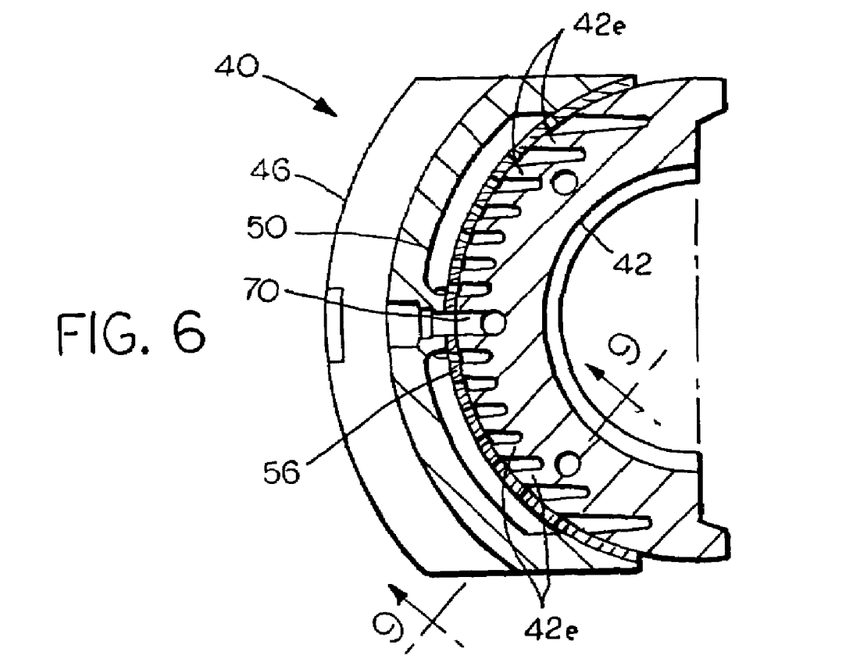
FIG. 6 is a sectional view taken on line 6-6 of FIG. 4.
Figure 7:
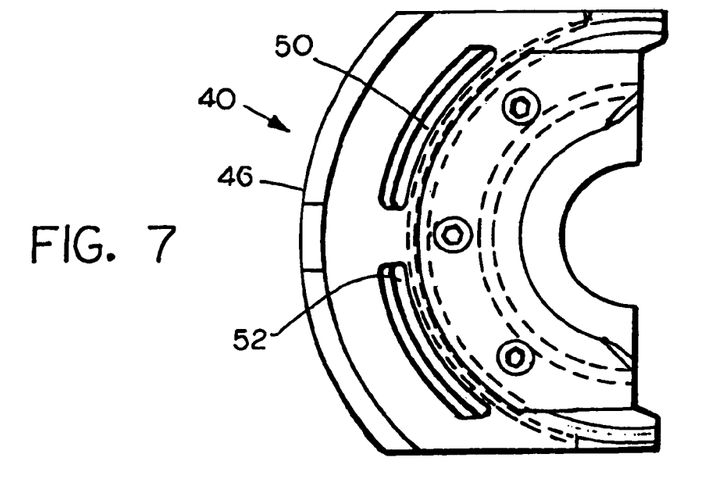
FIG. 7 is a bottom plan view of the mold section shown in FIGS. 4-6.

Cooling air flows into the flow passage 20 of the mold holder sections 16, 18 from a plenum 22 at the bottom of the mold holder 14 through a circumferentially spaced apart series of openings 24. From the flow passages 20 the cooling air flows radially inwardly against the mold sections 12a, 12b through generally semi-cylindrical, perforated screens 26 that are affixed to the interior of the mold holder sections 16, 18. Each of the screens 26 is positioned closely adjacent to the outer tips of the fins 12e of the adjacent mold element 12a or 12b, and each of the screens 26 is curved to conform to the curved surface defined by the outer tips of the fins 12e to control the rate and pattern of fluid flowing from the mold holder section 16, 18 against the fins 12e of the mold section 12a, 12b, respectively. The perforations in the perforated screens 26 are sized and spaced to vary the cooling air flow distribution vertically, and circumferentially if desired, with respect to the exteriors of the mold sections 12a, 12b to equalize the rate of cooling of the article in the mold 12, notwithstanding variations in the cooling load due to localized variations in the diameter or wall thickness of the glass article.

The mold holder sections 16, 18 of the mold holder 14 have less axial extent than the mold sections 12a, 12b, the fins 12e extending beyond axially opposed ends of the mold holder sections 16, 18, are centered with respect to the mold elements 12a, 12b. Thus, the cooling air from the mold holder 14 can exit from the exterior of the mold elements 12a, 12b through openings 28, 30 at the top and bottom, respectively, of the mold holder 14, in the orientation illustrated in FIG. 3.

The ends of mold holder sections 16, 18 are disengageably secured to diametrically opposed pairs of vertically extending connectors 32, 34 by cap screws 36. The connectors 32, 34 have radially inwardly projecting tabs 32a, 32b and 34a, 34b, respectively, that are received in slots of the mold elements 12a, 12b to accurately circumferentially position the mold holder sections 16, 18 with respect to the mold elements 12a, 12b. The tabs 32a, 32b and 34a, 34b so engage the free ends of the screens 26 to accurately circumferentially position the screens 26 with respect to the mold holder sections 16, 18, respectively. Further, the fins 12e of the mold elements 12a, 12b have radially outwardly projecting portions $12e^1$, $12e^{11}$ at the top and bottom, respectively, of each of the fins 12e. The portions $12e^1$, $12e^{11}$ have shoulders that engage the top and bottom of the mold holder sections 16, 18, respectively, to accurately axially position the mold holder sections 16, 18 with respect to the mold elements 12a, 12b, respectively.

Each mold holder 16, 18 has external hanger flange 80 for mounting the mold halves on the hanger arms 82 (FIG. 3) of the glassware molding machine.

FIGS. 4-9 illustrate an assembly 40 that is made up of a mold section 42 contained within a section 46 of a mold holder 44. It is to be understood that the assembly 40 is annular in configuration during a molding operation with the mold section 42 joined end to end with a like mold section, not shown. Likewise, the mold holder 44 is annular in configuration during a molding operation, with the mold holder section 46 being joined end to end with a like mold holder section, also not shown. In any case, the mold assembly 40 is shown as being of a type suitable for use in an I.S. machine in performing the final, or blow, molding step on a molten glass parison of the type that has previously been formed in a parison molding assembly 10, as heretofore shown and described. Because the assembly 40 is designed for use at the blow mold station of an I.S. machine, whereas the mold assembly 10 is designed for use at the parison mold station of such a machine, the inside diameter of the mold section 42, often referred to as the cavity, will be substantially larger than that of the annular mold 12 of the mold assembly 10, and the wall thickness of a glass article in engagement with the mold section 42 will be substantially less than that in engagement with the annular mold 12.

The mold section 42 is provided with a circumferentially disposed and axially extending spaced apart series of fins 42e that project outwardly from the mold section 42 to extend the outer surface of the mold section 42, and thereby increase the rate at which heat can be transferred from the glass article being blow molded in the mold assembly 40.

The heat from the glass article that has transferred to the fins 42e is positively transferred away from the fins 42e by forced air cooling, and in that regard the mold holder section 46 is provided with a generally semi-cylindrical flow passage 50 extending axially therethrough. The flow passage 50 receives cooling air through an inlet 52, and is radially open on its interior to permit cooling air to flow radially outwardly from the flow passage 50 against the fins 42e of the mold section 42. A perforated screen 56, which is generally semi-cylindrically shaped, is affixed to the interior of the mold holder section 46. The perforations in the perforated screen 56 are sized and spaced to vary the cooling air flow of distribution vertically, and circumferentially if desired, to equalize the rate of cooling of an article being molded in the mold assembly 40, notwithstanding variations in cooling load due to localized variations in the diameter or wall thickness of the glass article.

Figure 8:
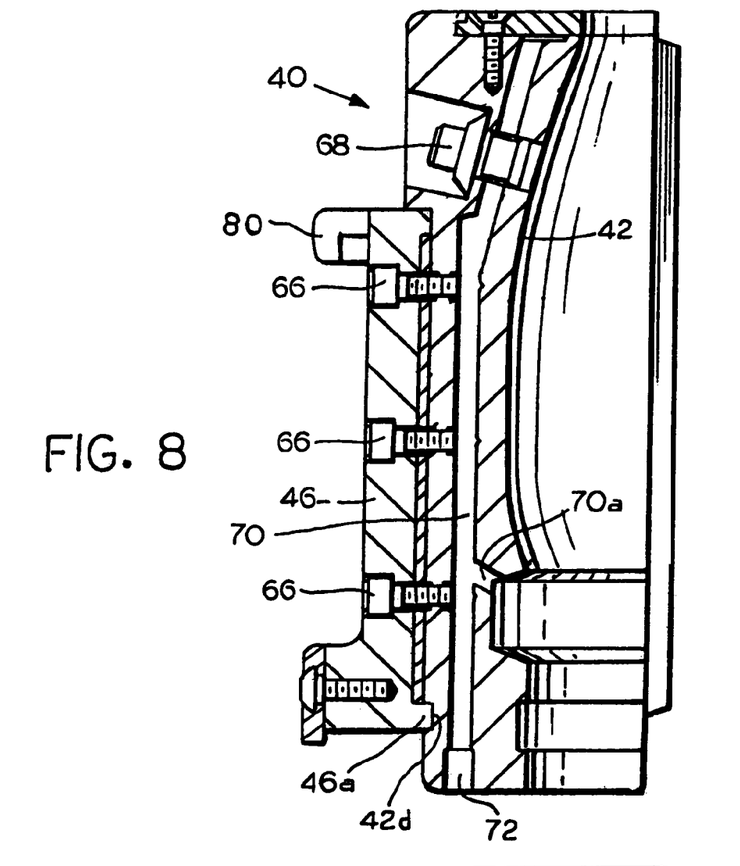
FIG. 8 is a sectional view taken on line 8-8 of FIG. 5.
Figure 9:
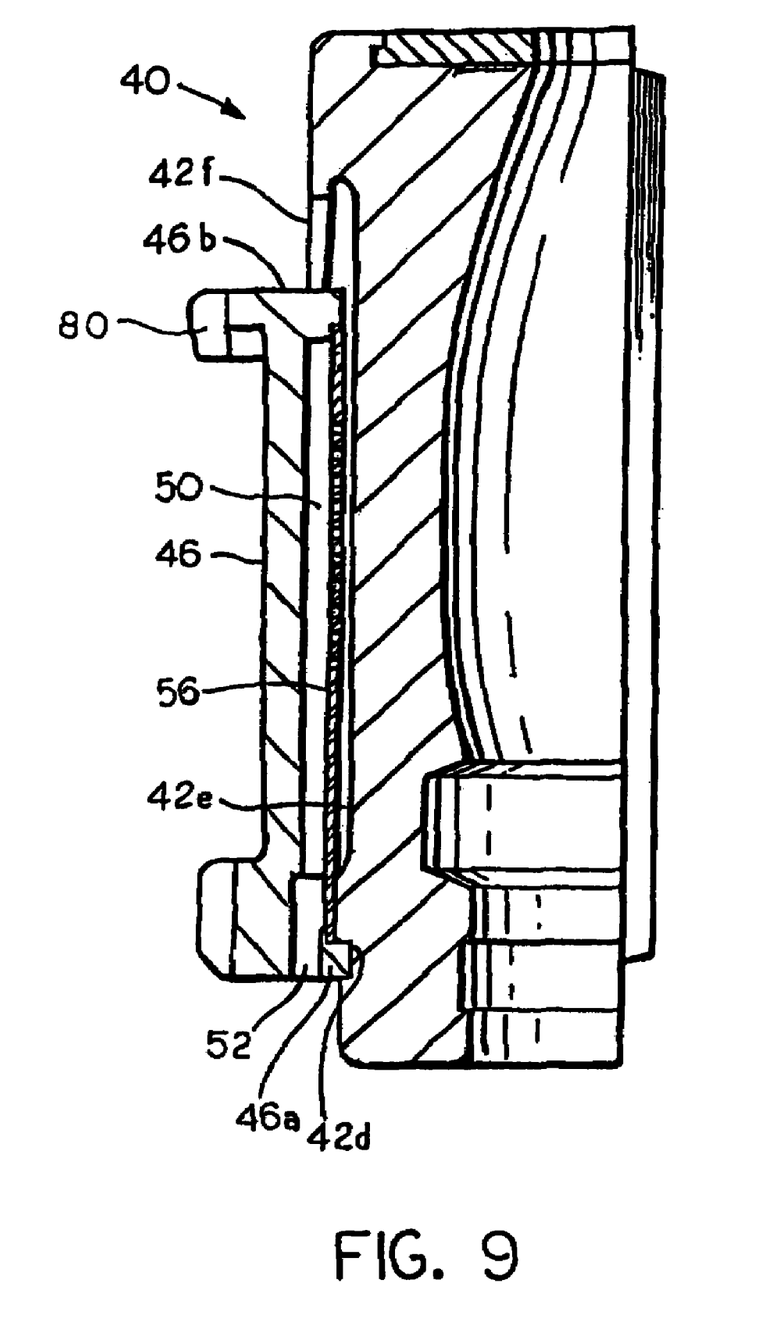
FIG. 9 is a sectional view taken on line 9-9 of FIG. 6.

As is best shown in FIGS. 8 and 9, the mold holder section 46 has less axial extent than the mold section 42. The mold section 42 is vertically centered with respect to the mold holder section 46 by providing the one of the mold section 42 and the mold holder section 46, shown as the mold section 42, with an outwardly facing groove 42*d* that receives an inwardly projecting tongue of one of the mold holder section 46 and the mold section 42, shown as the tongue 46*a* of the mold holder section 46, and further by providing the mold section 42 with a downwardly projecting flange 42*f* that seats against an uppermost surface 46*b* of the mold holder section 46. The mold section 42 is disengageably secured to the mold holder section 46 by a vertical series of spaced apart cap screws 66 (FIG. 8) that extend through the mold holder section 46 to be threadably received in the mold section 42.

To assist in the proper blowing of a glass article in the mold section 42 against the interior of the mold section 42, vacuum assist is provided to help draw the molten glass article against the inside surface of the mold section 42. To that end, a diametrically opposed pair of vertical vacuum slots 70 is provided in the mold section 42, and each of the vacuum slots 70 is connected to a source of vacuum, not shown, by means of a vacuum tap 68. The vacuum in the vacuum passage 70 is being imposed on the bottom of an article being molded in the mold section 42 by a circumferentially spaced apart series of generally radially extending vacuum passage extensions 70*a*. The vacuum slots 70 are provided with openings 72 at the bottom thereof to ensure that the air contained within each vacuum slot 70 does not become stagnant.

The best mode known by the inventors for carrying out the present invention as of the filing date hereof has been shown and described herein, but it will be apparent to those skilled in the art that suitable modifications, variations, and equivalents may be made without departing from the scope of the invention, such scope being limited solely by the terms of the following claims and the legal equivalents thereof.

What is claimed is:

1. A glassware mold assembly that includes a pair of mold halves adapted to be mounted on a molding machine to bring the mold halves together to form a mold cavity, each of said mold halves including:
    a semi-cylindrical mold element having a longitudinal dimension, an inner surface for cooperating with an inner surface of the mold element of the other mold half to form said mold cavity having an axis parallel to said longitudinal dimension, and an outer surface with a plurality of fins extending parallel to said longitudinal dimension, said fins having outer edges and longitudinal spaces between said fins,
    a part-cylindrical mold holder section having an inner portion to which said mold element is mounted, an outer portion with a hanger flange for mounting said mold assembly on a molding machine and an air passage that opens at said inner portion adjacent to said outer edges of said fins, and
    a perforated screen mounted between said air passage in said mold holder section and said fins on said mold element, said perforated screen being disposed adjacent to said outer edges of said fins and controlling distribution of air from said air passage in said holder to said spaces between said fins.

2. The mold assembly set forth in claim 1 wherein, in each of said mold halves, said fins extend axially from at least one end of said mold holder section so that said spaces between said fins form outlets for air flowing from said air passage in said mold holder section through said perforated screen and through said spaces between said fins.

3. The mold assembly set forth in claim 2 wherein said fins extend and said spaces open at both ends of said mold holder section.

4. The mold assembly set forth in claim 1 wherein, in each of said mold halves, said fins have shoulders for engaging the top and bottom of said mold holder section to locate said mold element on said mold holder section.

5. The mold assembly set forth in claim 4 wherein, in each of said mold halves, at least one threaded fastener extends through said mold holder section into said mold element to secure said mold holder section to said mold element.

6. The mold assembly set forth in claim 1 wherein, in each of said mold halves, said air passage in said mold holder section opens adjacent to an end of said mold holder section for receiving air from an air plenum carried by the molding machine adjacent to said mold holder section.

7. The mold assembly set forth in claim 1 wherein, in each of said mold halves, said fins on said mold element have outer edges that define a part-cylindrical surface, said perforated screen is part-cylindrical in geometry and overlies said part-cylindrical surface, and said air passage in said mold holder section has a part-cylindrical outlet end disposed in radially outward alignment with said perforated screen.

8. The mold assembly set forth in claim 1 wherein each of said mold elements has side edges that engage side edges of the opposing mold element when the mold halves are closed,
    one of said side edges of each mold element having an axially extending tongue and the other of said side edges of each mold element having an axially extending groove,
    said tongues being receivable in said grooves to align said mold elements when said mold halves are closed.

9. A mold arrangement of a glassware forming machine, comprising:
    an annular mold formed by a pair of separable mold elements that, during a molding step, are positioned to enclose a single cavity, each mold element having a plurality of fins on its external surface, tips of said fins defining a curved surface,
    a mold holder formed by a pair of separable mold holder sections,
    each mold holder section being connected to a respective mold element surrounding at least a substantial axial length portion of each mold element,
    the mold holder sections being positioned adjacent to each other during the molding step and, together with the respective mold element to which each mold holder section is connected, positioned separated from one another during a step of removing a molded glass article from said mold,
    each of the mold holder sections having an air flow passage that extends through the holder section and has an outlet to permit air to flow against the fins of the adjacent mold element to assist in cooling the hollow glass article in the mold, and
    perforated screens, which are semi-cylindrically shaped corresponding to the surface of the tips of the fins, provided in an outlet of the respective flow passages, which screens are configured to control the rate and pattern of air flowing from the flow passages against the fins of the respective adjacent mold elements, characterized in that the annular mold and the mold holder, which also is annular in shape, form a mold assembly that includes said air flow passages and said screens for distributing cooling air over the mold, each mold holder section is semi-cylindrical in shape and adapted for being inserted into and coupled to a member of the glass forming machine which has an air plenum to be connected at an axial end of the air flow passage of the adjacent mold holder section, the fins of each mold element are circumferentially disposed and extend axially at least above the mold holder sections to form exit openings for the cooling air, and the screen in the outlet of each air flow passage is configured to control the rate and pattern of air flowing from the air flow passage against the axially extending fins of the respective adjacent mold element.

10. The apparatus set forth in claim 9 wherein the screen is affixed to the outlet opening of each mold holder section and the perforations in each screen are sized and spaced in respect to the cooling air flow distribution as desired for the actual article to be molded.

11. The apparatus set forth in claim 10 wherein each mold holder section is connected to a mold element by first and second pairs of connectors, each connector being secured to a respective free end of one of said mold holder sections, so that the connectors of said pairs are opposite to one another, each of said mold elements having a pair of inwardly projecting slots, each of said connectors having an inwardly projecting tab that is received in a respective slot of the mold elements to accurately circumferentially position each pair of connectors and the mold holder section that is secured to it with respect to an adjacent one of said mold elements.

12. The apparatus set forth in claim 9 wherein at least one of the fins carried by each of said pair of mold elements has spaced apart upper and lower radially outwardly projecting portions engaged with an adjacent one of said mold holder sections to accurately axially position said each of said pair of mold elements with respect to said adjacent one of said mold holder sections, and to form an upper and a lower exit opening for cooling air.

13. The apparatus set forth in claim 9 wherein the air flow passage in each mold holder section is substantially semi-cylindrical in shape.

14. The apparatus set forth in claim 9 wherein each mold holder section is connected to a mold element by at least one threaded fastener extending through each of said mold holder sections, said fastener being threadably received in an adjacent one of said mold elements for releasably securing said adjacent one of said mold elements to the mold holder section through which said fastener extends.

15. The apparatus set forth in claim 9 wherein one of said mold holder sections and said mold elements has a groove that faces toward an adjacent one of the other of said mold holder sections and said mold sections, and wherein the other of said mold holder sections and said mold sections has a tongue being received in said groove to accurately position said one of said mold holder sections and said adjacent one of said mold sections with respect to one another.

* * * * *